(12) United States Patent
Yu et al.

(10) Patent No.: US 11,536,983 B2
(45) Date of Patent: Dec. 27, 2022

(54) THIN-PLATE-TYPED ROTATING MODULE

(71) Applicant: TDK Taiwan Corp., Taipei (TW)

(72) Inventors: Cheng Kai Yu, Taoyuan County (TW); Chao Chang Hu, Taoyuan County (TW); Chih Wei Weng, Taoyuan County (TW)

(73) Assignee: TDK Taiwan Corp.

( * ) Notice: Subject to any disclaimer, the term of this patent is extended or adjusted under 35 U.S.C. 154(b) by 62 days.

(21) Appl. No.: 17/120,155

(22) Filed: Dec. 12, 2020

(65) Prior Publication Data

US 2021/0096390 A1    Apr. 1, 2021

Related U.S. Application Data

(63) Continuation of application No. 16/173,185, filed on Oct. 29, 2018, now Pat. No. 10,895,755, which is a continuation of application No. 15/171,254, filed on Jun. 2, 2016, now Pat. No. 10,126,563.

(51) Int. Cl.
| | |
|---|---|
| *G02B 27/64* | (2006.01) |
| *G02B 26/08* | (2006.01) |
| *H02K 41/035* | (2006.01) |
| *H02K 16/00* | (2006.01) |

(52) U.S. Cl.
CPC ....... *G02B 27/646* (2013.01); *G02B 26/0816* (2013.01); *G02B 26/0883* (2013.01); *H02K 16/00* (2013.01); *H02K 41/0356* (2013.01); *H02K 2201/18* (2013.01)

(58) Field of Classification Search
CPC ........ G02B 7/18; G02B 27/64; G02B 27/646; G02B 26/08; G02B 26/0816; G02B 26/0883; G02B 26/10; G02B 26/0858; G02B 26/0841; G02B 26/085; G02B 26/0833; G02B 26/101; G02B 26/105; G02B 26/106; H02K 33/00; H02K 16/00; H02K 41/0356; H02K 2201/18; B60R 1/06; B60R 1/072; H04N 9/3129
USPC ......... 359/221.2, 198.1, 199.3, 199.4, 199.2, 359/201.2, 211.5, 212.1, 214.1, 200.6, 359/223.1, 224.1, 298, 555, 872–874
See application file for complete search history.

(56) References Cited

U.S. PATENT DOCUMENTS 6,949,996 B2 *   9/2005   Matsumoto .......... G02B 26/085
                                                                        335/78

* cited by examiner

*Primary Examiner* — Jie Lei

(57) ABSTRACT

A thin-plate-typed rotating module includes a rotating element, a driving unit and a base board. The rotating element is rotatable about a first axial direction and a second axial direction in a limited degree. The driving unit connects the rotating element for driving the rotating element to rotate about the first and second axial directions. The base board is furnished with a control module which is connected with the driving unit for controlling the driving unit to operate.

13 Claims, 13 Drawing Sheets

FIG.8B Cross section C-C

US 11,536,983 B2

THIN-PLATE-TYPED ROTATING MODULE

This application claims the benefit of Taiwan Patent Application Ser. No. 104119438, filed Jun. 16, 2015, the subject matter of which is incorporated herein by reference.

BACKGROUND OF INVENTION

1. Field of the Invention

The invention relates to a thin-plate-typed rotating module, and more particularly to an anti-shake compensation module that applies an electromagnetic driving unit to drive a thin elastic-plated rotating element to undergo pivotal motions about two different axes. This invention can be applied to an optical system to avoid possible instability caused by unexpected shaking.

2. Description of the Prior Art

In an optical system consisted of optical lenses and image-capturing modules, such as the optical system for a camera, a video recorder or the like, may meet an obscure image caused by a bias or a shake in an optical path of the image-capturing module from unexpected foreign incidents or handshakes. A common resort to such a situation is to provide a digital or optical compensation mechanism for correcting the obscure image caused by unexpected shaking. The digital compensation mechanism is to analyze and process the image captured by the image-capturing module in a digital manner so as to obtain a much clearer digitalized image. In the art, the digital compensation mechanism is also called as a digital anti-shake mechanism. On the other hand, the optical compensation mechanism is to introduce an additional optical lens set or an anti-shake device to the image-capturing module. In the art, this type of the compensation mechanism is also called as an optical anti-shake mechanism. Nevertheless, current optical anti-shake mechanisms in the market place usually involve complicated or cumbersome structures. Namely, the conventional optical anti-shake mechanism is usually featured in complicate manufacturing, difficult assembling, a higher cost and an irreducible volume. Thus, an improvement thereupon is definitely needed.

SUMMARY OF THE INVENTION

Accordingly, it is the primary object of the present invention to provide a thin-plate-typed rotating module applicable to perform as an anti-shake device in an optical system. The thin-plate-typed rotating module in this present invention is mainly to produce a specific multi-framed rotating element by forming trenches on a thin-plated spring complex, and further to introduce an electromagnetic driving unit to drive the rotating element to perform a twin-axial pivotal motion in a limited degree, so that the anti-shake device featured in simple structuring, easy assembling, a small occupation and less costing can be obtained.

In the present invention, the thin-plate-typed rotating module, defined with an orthogonal coordinate system having an X axis, a Y axis and a Z axis and an optical path extending in the Z axis, includes:

a rotating element, located the optical path to perform at least a limited pivotal motion in a first axial direction and a second axial direction;

a driving unit, engaging the rotating element for driving the rotating element to perform the limited pivotal motion in the first axial direction and the second axial direction;

a position-detecting unit for detecting pivotal displacements of the rotating element in the first axial direction and the second axial direction;

an optical path-adjusting element, located at the rotating element and on the optical path; and, a base board, including a control module and electrically coupling the position-detecting unit and the driving unit, basing on the pivotal displacements of the rotating element detected by the position-detecting unit to control the driving unit to drive the rotating element to rotate so as to compensate possible deviations in the optical path caused by shakes.

The rotating element is a thin-plated spring complex further having an outer frame, a middle frame, and an inner plate.

The inner plate has a plane facing the optical path to define thereon the first axial direction and the second axial direction The middle frame circles around a periphery of the inner plate by at least one first through trench for spacing and two first connection ribs in the first axial direction for connection.

The outer frame circles around a periphery of the middle frame by at least one second through trench for spacing and two second connection ribs in the second axial direction for connection.

In the present invention, the driving unit can push the inner plate to undergo the pivotal motion with respect to the outer frame in the first axial direction and the second axial direction.

In one embodiment of the present invention, the driving unit is an electromagnetic driving unit further including an inner carrier structure, an outer carrier structure, at least a first magnet, at least a second magnet, at least a first coil and at least a second coil;

the inner carrier structure engages the inner plate in a co-moving manner while the outer carrier structure is fixed at the outer frame;

one of the first magnet and the first coil is located at the inner carrier structure while another thereof is located at the outer carrier structure, the first coil being energized to produce an electromagnetic force to push the inner carrier structure associated with the inner plate to undergo the pivotal motion in the first axial direction; and, one of the second magnet and the second coil is located at the inner carrier structure while another thereof is located at the outer carrier structure, the second coil being energized to produce another electromagnetic force to push the inner carrier structure associated with the inner plate to undergo the pivotal motion in the second axial direction.

In one embodiment of the present invention, the inner carrier structure is formed as a square frame structure having a first rectangular connection portion to connect with a bottom of the inner plate, the first rectangular connection portion further having four first flanges protrusive in a direction away from the inner plate, each of the four first flanges being shaped as a rectangle and perpendicular to the two neighboring first flanges at two opposing ends thereof, each of the first flanges having a first accommodation space;

the outer carrier structure is formed as another square frame structure having a second rectangular connection portion to connect with a bottom of the outer frame, the second rectangular connection portion further having four second flanges protrusive in a direction away from the outer frame, each of the four second flanges being shaped as a rectangle and perpendicular to the two neighboring second flanges at two opposing ends thereof, each of the second flanges having a second accommodation space;

the first magnet is mounted in the corresponding first accommodation space of the inner carrier structure while the first coil is mounted in the corresponding second accommodation space of the outer carrier structure via the coil-fixing structure; and, the second magnet is mounted in the corresponding first accommodation space of the inner carrier structure while the second coil is mounted in the corresponding second accommodation space of the outer carrier structure via the coil-fixing structure.

All these objects are achieved by the thin-plate-typed rotating module described below.

BRIEF DESCRIPTION OF THE DRAWINGS

The present invention will now be specified with reference to its preferred embodiment illustrated in the drawings, in which:

FIG. 8B is a cross-sectional view of FIG. 8A along line C-C;

DESCRIPTION OF THE PREFERRED EMBODIMENT

The invention disclosed herein is directed to a thin-plate-typed rotating module. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The design of the thin-plate-typed rotating module in this present invention is mainly to produce a specific multi-framed rotating element by forming trenches on a thin-plated spring complex, and further to introduce an electromagnetic driving unit to drive the rotating element to perform a twin-axial pivotal motion in a limited degree, so that an improved optical anti-shake apparatus with a shake-compensation function can be thus obtained. In this apparatus, the electromagnetic driving unit is consisted of plural permanent magnets and coils that are positioned by specific-designed inner and outer carrier structures so as to form a simple-structured, easy-assembled, small-occupation and less-cost anti-shake compensation apparatus.

Figure 1:
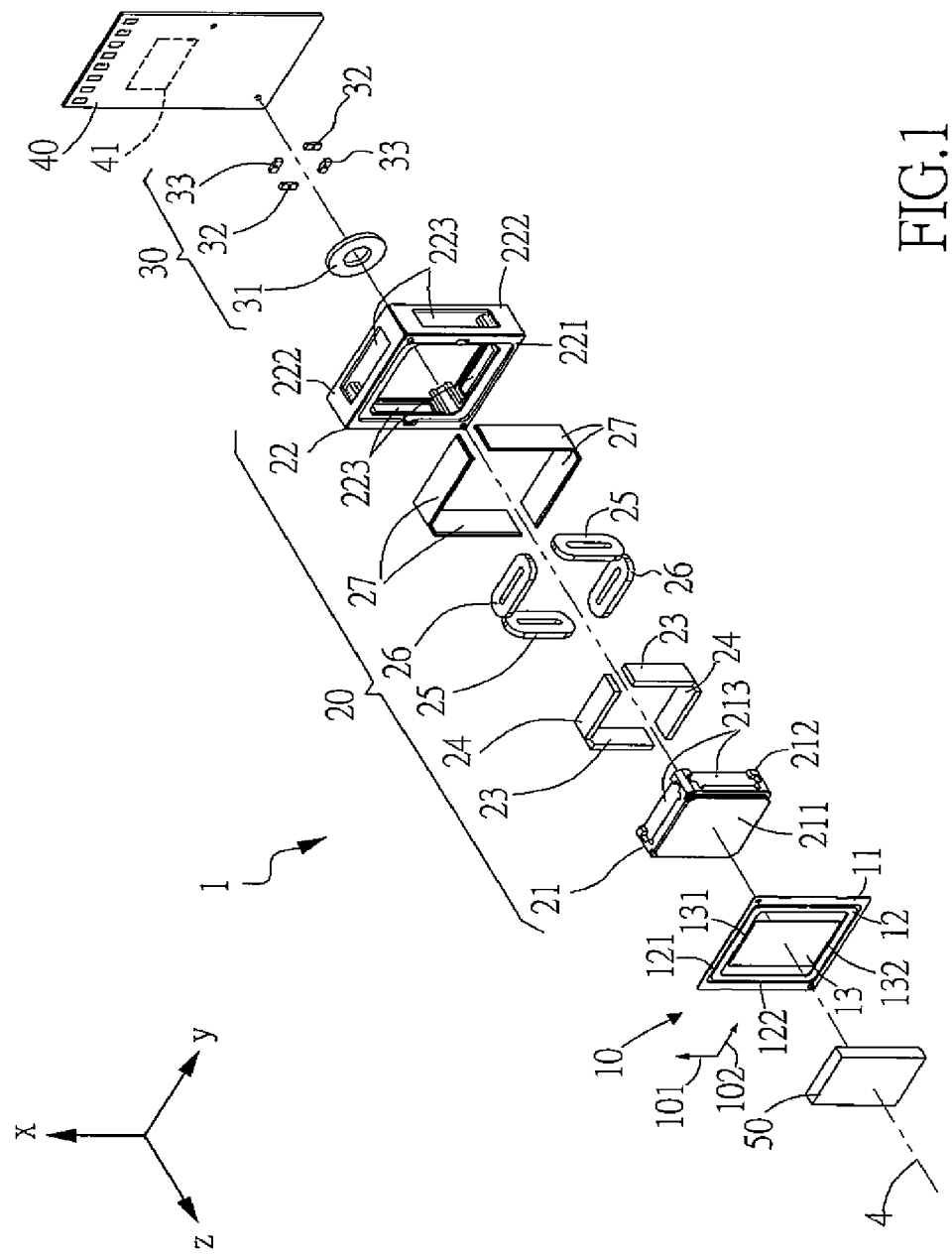
FIG. 1 is a schematic exploded view of a first embodiment of the thin-plate-typed rotating module in accordance with the present invention.
Figure 2:
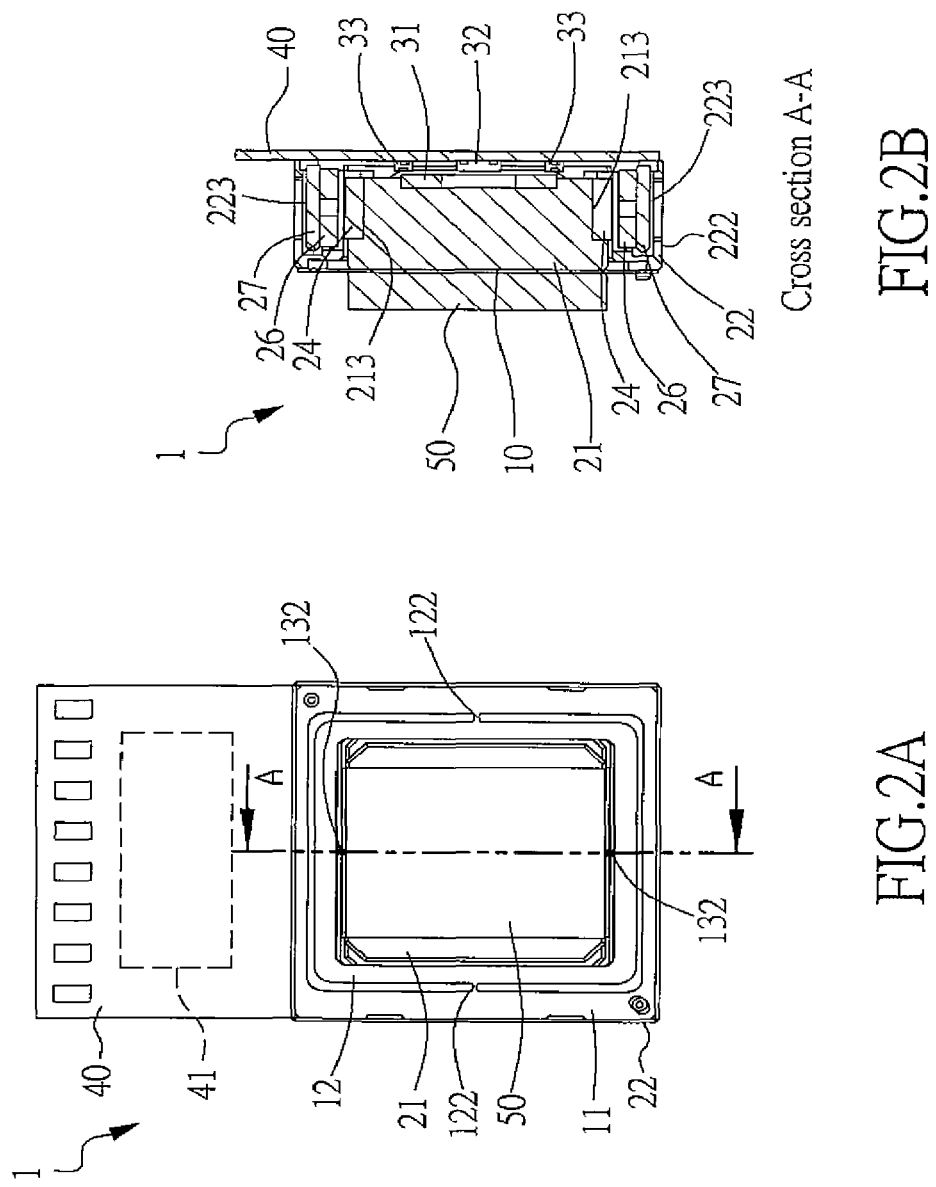
FIG. 2A is a top view of FIG. 1.
FIG. 2B is a cross-sectional view of FIG. 2A along line A-A.
Figure 3:
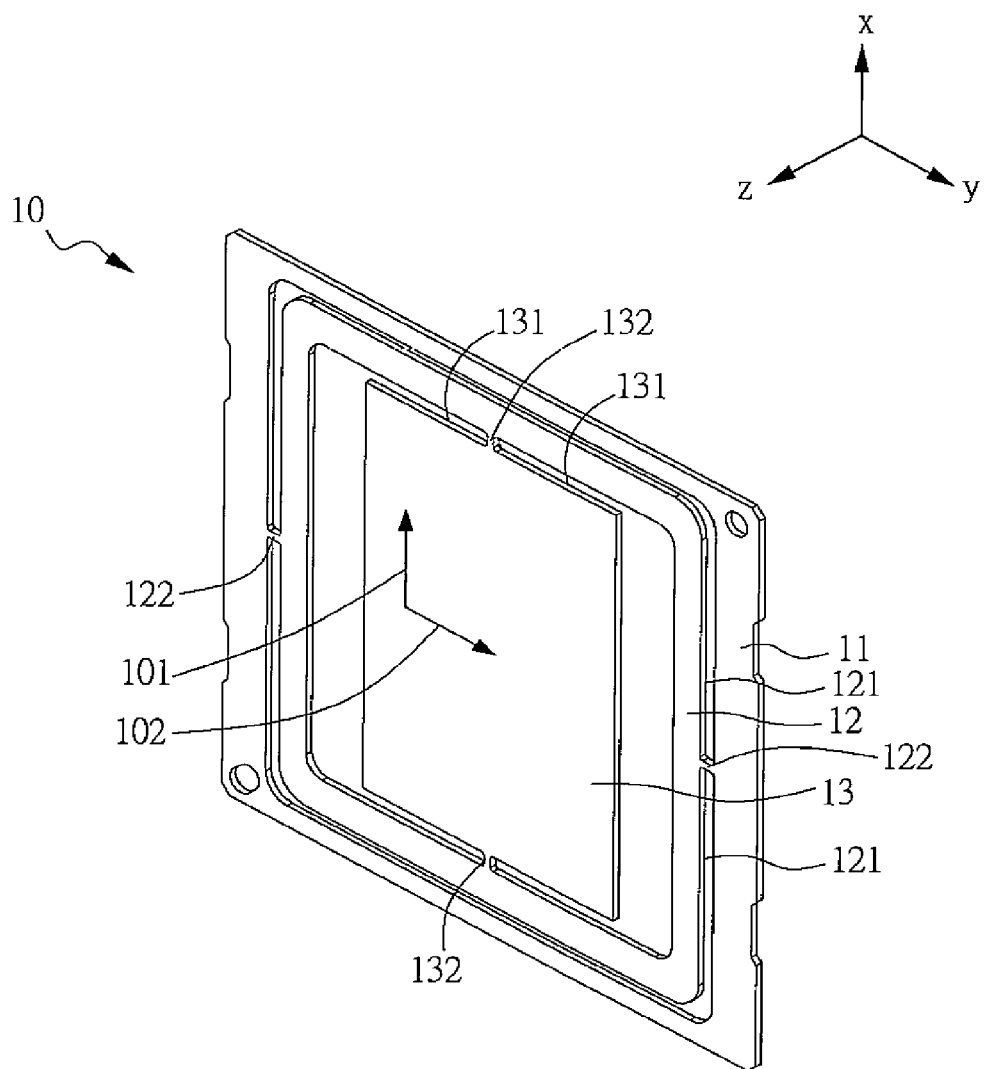
FIG. 3 is an enlarged view of the rotating element of FIG. 1.

Refer now to FIG. 1 to FIG. 3; where FIG. 1 is a schematic exploded view of a first embodiment of the thin-plate-typed rotating module in accordance with the present invention, FIG. 2A is a top view of FIG. 1, FIG. 2B is a cross-sectional view of FIG. 2A along line A-A, and FIG. 3 is an enlarged view of the rotating element of FIG. 1.

As shown in FIG. 1, the first embodiment 1 of the thin-plate-typed rotating module 1, defined with an X-Y-Z orthogonal coordinate system (having an X axis, a Y axis and a Z axis) and an optical path 4 extending in the Z axis, includes a rotating element 10, a driving unit 20, a position-detecting unit 30, a base board 40, and an optical path-adjusting element 50.

The rotating element 10 located on the optical path 4 can perform a pivotal motion in a limited degree at least in a first axial direction 101 and a second axial direction 102 perpendicular to the first axial direction 101. The first axial direction 101 and the second axial direction 102 are both perpendicular to the Z axis and parallel respectively to the X axis and the Y axis. Referring to FIG. 3, in this first embodiment, the rotating element 10 can be formed as a rectangular thin-plated spring complex. The thin-plated spring complex has four lateral sides and further includes an outer frame 11, a middle frame 12, and an inner plate 13. The inner plate 13 has a plane facing the optical path 4 to define thereon the first axial direction 101 and the second axial direction 102. The middle frame 12 circles around a periphery of the inner plate 13 by at least one first through trench 131 for spacing and two first connection ribs 132 in the first axial direction 101 for connection. Typically, the two first connection ribs 132 are located to opposing lateral sides of the inner plate 13 so as to divide the at least one first through trench 131 into two U-shape first through trenches 131. The connection between the inner plate 13 and the middle frame 12 is provided by the two first connection ribs 132. The outer frame 11 circles around a periphery of the middle frame 12 by at least one second through trench 121 for spacing and two second connection ribs 122 in the second axial direction 102 for connection. Typically, the two second connection ribs 122 are located to opposing lateral sides of the middle frame 12 so as to divide the at least one second through trench 121 into two U-shape second through trenches 121. The connection between the middle frame 12 and the outer frame 1' is provided by the two second connection ribs 132. Namely, the two first connection ribs 132 and the two second connection ribs 122 are located to the four lateral sides of the rectangular thin-plated spring complex, respectively, so as to utilize the elasticity of thin-plated spring complex to allow the inner plate 13 to undergo a limited pivotal motion with respect to the outer frame 11 about the two first connection ribs 132 (i.e. the first axial direction 101) and also to allow the inner plate 13 to undergo another limited pivotal motion with respect to the outer frame 11 about the two second connection ribs 122 (i.e. the second axial direction 102). Upon such an arrangement, the rotating element 10 can provide the designed two-axial rotating function. Hence, by providing through trenches to the thin-plated spring complex so as purposely to form a multi-frame structure, the simple-structured, small-occupation and less-cost rotating element 10 can be provided in a unique-piece manner.

As shown in FIG. 1 to FIG. 3, the driving unit 20 is connected with the rotating element 10 at one side and engages the base board 40 at another side, so as to drive the rotating element 10 to undergo limited pivotal motions in the first axial direction 101 and the second axial direction 102. In this first embodiment, the driving unit 20 embodied as an electromagnetic driving unit can include at least an inner carrier structure 21, an outer carrier structure 22, at least a first magnet 23, at least a second magnet 24, at least a first coil 25, at least a second coil 26 and a plurality of coil-fixing structures 27.

The inner carrier structure 21 is connected with a bottom of the inner plate 13 in a co-moving manner. The outer carrier structure 22 is connected with a bottom of the outer frame 11 and further engages the base board 40 to form a fixed structure.

One of the first magnet 23 and the corresponding first coil 25 is located at the inner carrier structure 21, while another thereof is located at the outer carrier structure 22. In this first embodiment, one first magnet 23 is located at each of two lateral sides of the inner carrier structure 21 that are close to the two second connection ribs 122, and one first coil 25 is located at each of two lateral sides of the outer carrier structure 22 that are close to the two second connection ribs 122, via the coil-fixing structure 27 at position by corresponding to the respective first magnet 23. By energizing the two first coils 25, an electromagnetic force can be induced to push the two first magnets 23 at the inner carrier structure 21 together with the inner plate 13 to undergo a pivotal motion about the first axial direction 101.

One of the second magnet 24 and the corresponding second coil 26 is located at the inner carrier structure 21, while another thereof is located at the outer carrier structure 22. In this first embodiment, one second magnet 24 is located at each of two lateral sides of the outer carrier structure 22 that are close to the two first connection ribs 132, and one second coil 26 is located at each of two lateral sides of the outer carrier structure 22 that are close to the two first connection ribs 132, via the coil-fixing structure 27 at position by corresponding to the respective second magnet 24. By energizing the two second coils 26, an electromagnetic force can be induced to push the two second magnets 24 at the inner carrier structure 21 together with the inner plate 13 to undergo another pivotal motion about the second axial direction 102.

The inner carrier structure 21 formed as a square frame structure has a first rectangular connection portion 211 to connect with the bottom of the inner plate 13. The first rectangular connection portion 211 has four first flanges 212 protrusive in a direction away from the inner plate 13. Each of the four first flanges 212 is shaped as a rectangle and perpendicular to the two neighboring first flanges 212 at opposing ends thereof. Each of the first flanges 212 has a first accommodation space 213. The outer carrier structure 22 formed as another square frame structure has a second rectangular connection portion 221 to connect with the bottom of the outer frame 11. The second rectangular connection portion 221 has four second flanges 222 protrusive in a direction away from the outer frame 11. Each of the four second flanges 222 is shaped as a rectangle and perpendicular to the two neighboring second flanges 222 at opposing ends thereof. Each of the second flanges 222 has a second accommodation space 223.

In the first embodiment, the first magnet 23 is mounted in the corresponding first accommodation space 213 of the inner carrier structure 21, and the first coil 25 is mounted in the corresponding second accommodation space 223 of the outer carrier structure 22 via the coil-fixing structure 27. Similarly, the second magnet 24 is mounted in the corresponding first accommodation space 213 of the inner carrier structure 21, and the second coil 26 is mounted in the corresponding second accommodation space 223 of the outer carrier structure 22 via the coil-fixing structure 27. As described above, by providing these two specific square frame structures (the inner and outer carrier structures 21, 22) to mount and position the first and second magnets 23, 24 and the first and second coils 25, 26, the module 1 of the present invention can be easily applied to an optical system such as a digital camera or a digital recorder. Further, the thin-plate-typed rotating module 1 of the present invention can then be produced in a simple-structured, easy-assembled, limited-occupied and less-prized manner.

In the first embodiment of the present invention, the position-detecting unit 30 includes a Hall-effect sensing magnet 31, at least one X-axis position-detecting sensor 32 (two shown in the figure), and at least one Y-axis position-detecting sensor 33 (two shown in the figure). The Hall-effect sensing magnet 31 is mounted on the inner carrier structure 21, and the X-axis position-detecting sensor 32 and the Y-axis position-detecting sensor 33 are individually mounted to predetermined positions on the base board 40 respective to the Hall-effect sensing magnet 31. Namely, the X-axis position-detecting sensor 32 and the Y-axis position-detecting sensor 33 of the position-detecting unit 30 are used to detect position differences between every two position-detecting sensors and thereby to calculate relative angular changes. Thus, any pivotal displacement of the inner carrier structure 21 with respect to the rotating element 10 can be detected. Since the aforesaid sensors 32, 33 can be adopted or selected from the conventional products already in the market place, and thus details thereabout are omitted herein.

In the first embodiment of the present invention, the base board 40 can be a printed circuit board (PCB) including a control module 41 and electrically coupled with the position-detecting unit 30 and the driving unit 20. According to the pivotal displacement of the rotating element 10 detected by the position-detecting unit 30, the base board 40 can control the driving unit 20 to drive the rotating element 10 to rotate so as to compensate possible deviations in the optical path 4 caused by shakes or the like impacts. Since the aforesaid base board 40 and the control module 41 can be adopted or selected from the conventional products already in the market place, and thus details thereabout are omitted herein.

In the first embodiment of the present invention, the optical path-adjusting element 50 is located on a surface plane of the inner plate 13 of the rotating element 10 to reflect lights in the optical path 4 for a purpose of adjusting the optical path, and can be one of a mirror and a prism.

In the following embodiments of the present invention, for a large amount of elements are the same or resembled to those in the foregoing first embodiment described above, thus details thereabout would be omitted herein, and those elements would be assigned the same names and numbers.

However, to those elements that are similar to the respective elements in the aforesaid first embodiment, though the same names and numbers are still applied, yet individual tailing letters would be added to the corresponding numbers.

Figure 4:
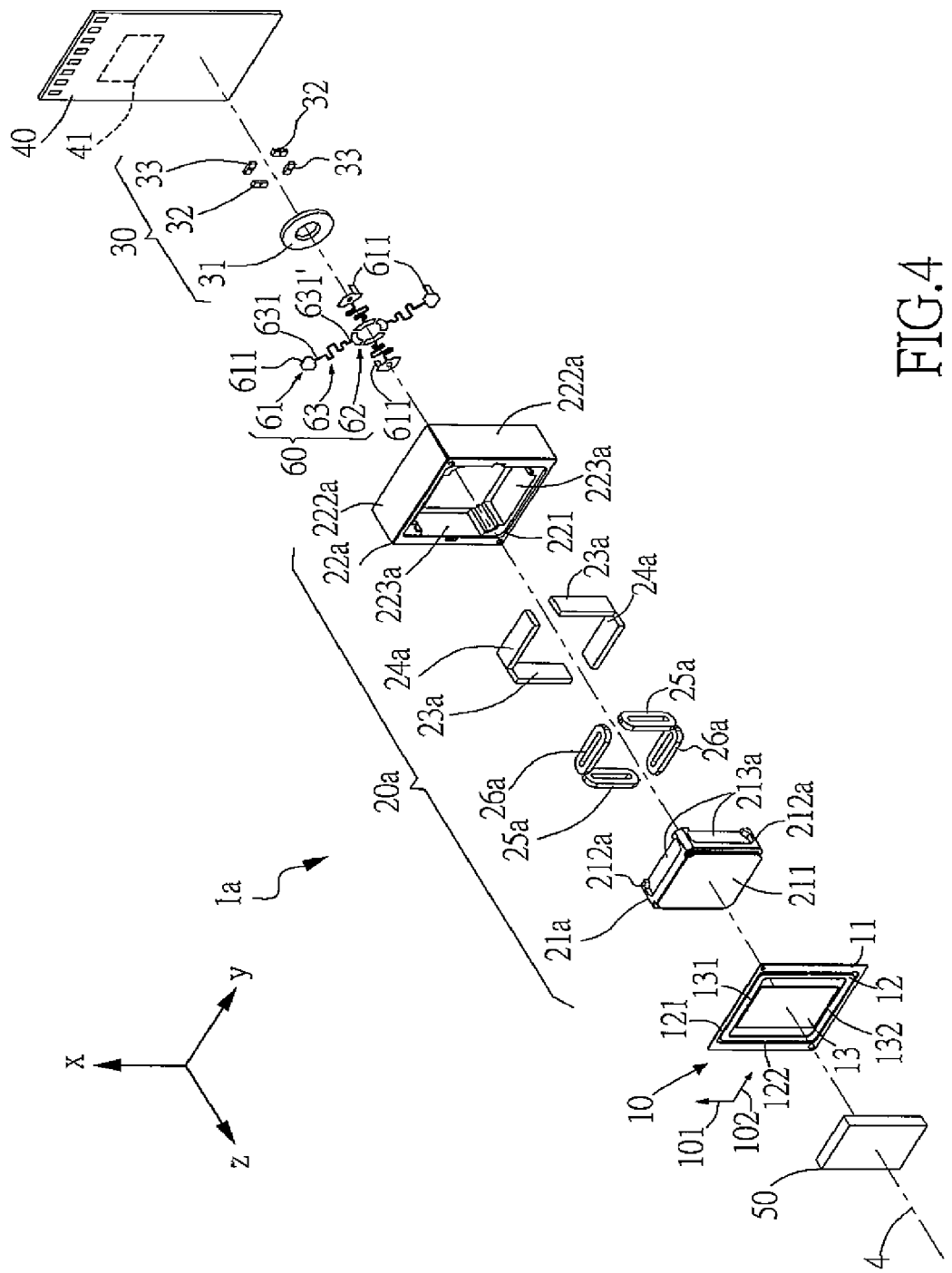
FIG. 4 is a schematic exploded view of a second embodiment of the thin-plate-typed rotating module in accordance with the present invention.
Figures 5A, 5B:
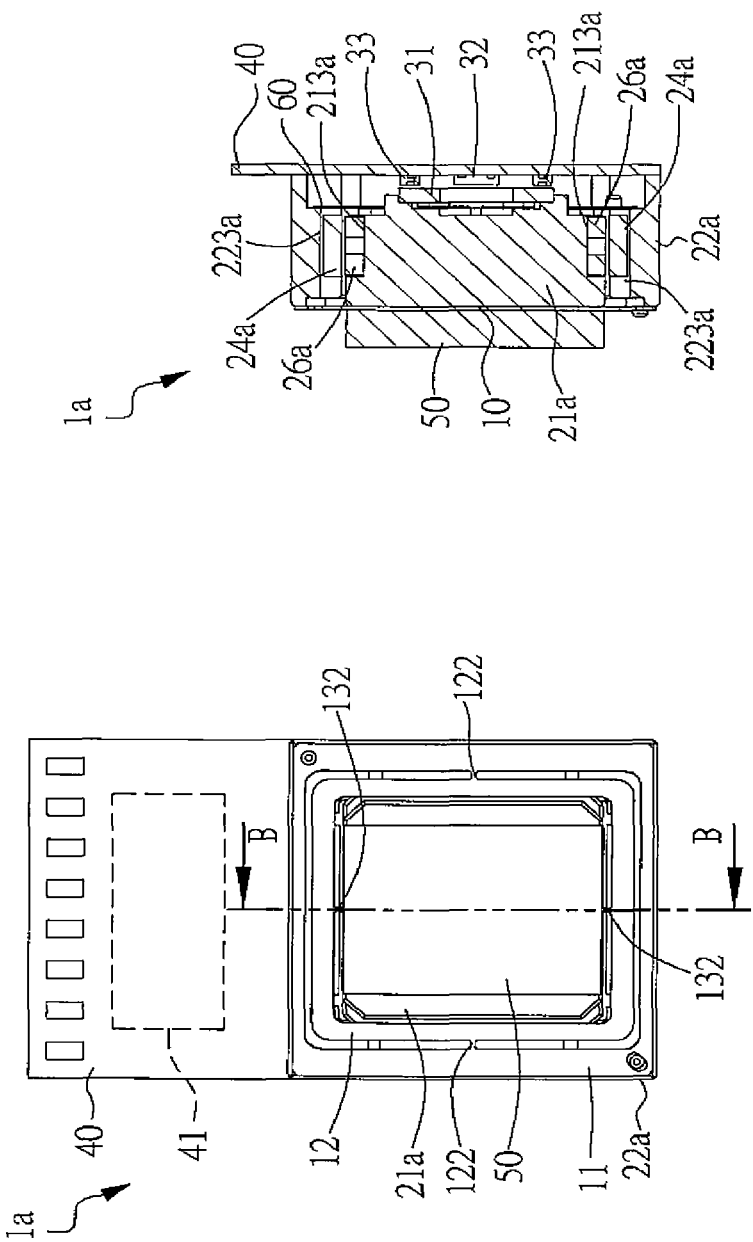
FIG. 5A is a top view of FIG. 4.
FIG. 5B is a cross-sectional view of FIG. 5A along line B-B.
Figure 6:
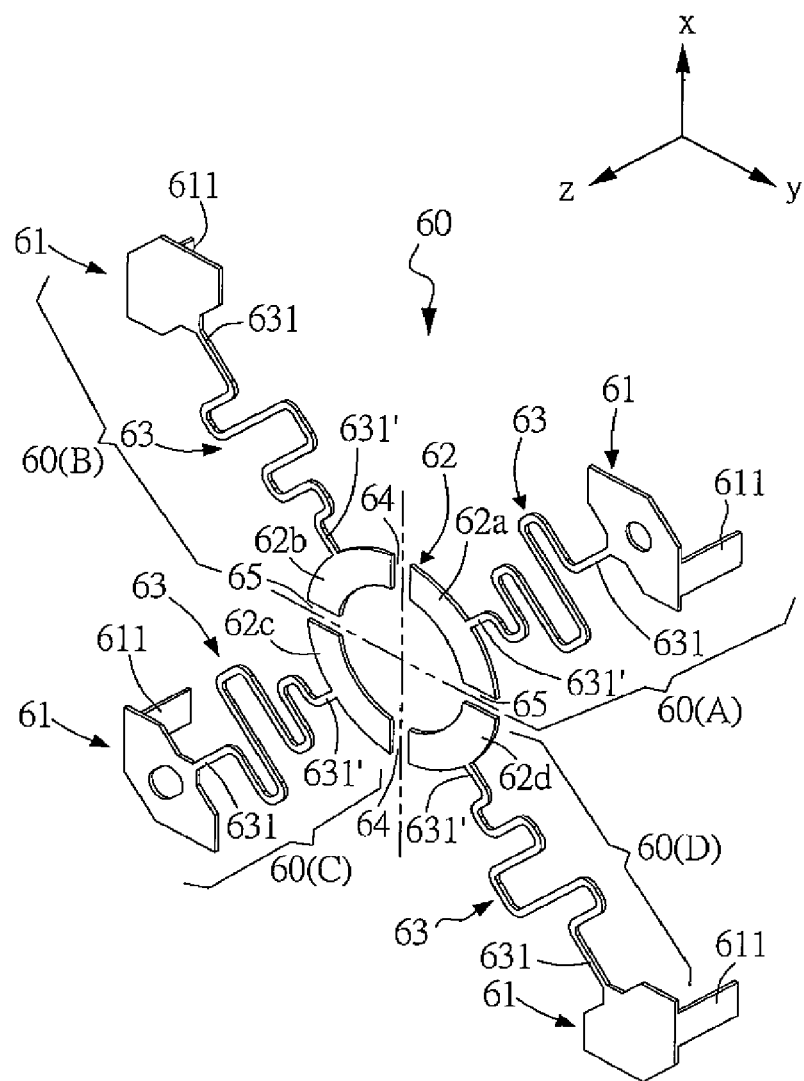
FIG. 6 is an enlarged view of the lower spring complex of FIG. 4.

Refer now to FIG. 4 to FIG. 6; where FIG. 4 is a schematic exploded view of a second embodiment of the thin-plate-typed rotating module in accordance with the present invention, FIG. 5A is a top view of FIG. 4, FIG. 5B is a cross-sectional view of FIG. 5A along line B-B, and FIG. 6 is an enlarged view of the lower spring complex of FIG. 4.

Largely, the second embodiment of the thin-plate-typed rotating module shown from FIG. 4 to FIG. 6 is similar structurally to the first embodiment shown from FIG. 1 to FIG. 3, and thus descriptions for the same elements would be omitted herein. The major difference between the first and the second embodiments is that the thin-plate-typed rotating module 1a of the second embodiment further includes a lower spring complex 60. The lower spring complex 60 further includes at least one outer fixation end 61, at least one inner fixation end 62 and at least one connection portion 63. The connection portion 63 is winding, elastic and bendable. Two opposing connection ends 631, 631' of the connection portion 63 are connected to the outer fixation end 61 and the inner fixation end 62, respectively. The outer fixation end 61 is connected with the outer carrier structure 22a (also referred as the fixed part), and the inner fixation end 62 is connected with the inner carrier structure 21a (also referred as the movable part), such that the weight of the inner carrier structure 21a can be elastically supported by the outer carrier structure 22a.

In the present invention, the lower spring complex 60 can be made of a conductive metallic material, and can further include a first separation spacing 64 and a second separation spacing 65. The first separation spacing 64 is perpendicular to the second separation spacing 65 by a crossing manner so as together to divide the inner fixation end 62 of the lower spring complex 60 into four independent plate segments 62a~62d. Each of the independent plate segments 62a~62 of the inner fixation end 62 is connected to the corresponding connection portion 63 and thus the corresponding outer fixation end 61, such that four spring units 60(A)~60(D) can thus be formed. These four continuous-structured spring units 60(A)~60(D) are arranged into a ring shape with the optical path 4 as the center line. By fixing these four outer fixation ends 61 and these four independent plate segments 62a~62d to the outer carrier structure 22a and the inner carrier structure 21a respectively, the inner carrier structure 21a can then be elastically supported by the outer carrier structure 22a through the lower spring complex 60. As shown in FIG. 6, each of the outer fixation ends 61 further includes a protrusive lead 611 extending vertically therefrom and parallel to the Z axis. Through the protrusive lead 611, electric connection with the driving unit 20a and the position-detecting unit 30 can thus be established.

In the second embodiment 1a of the thin-plate-typed rotating module, the first magnets 23a and the second magnets 24a of the driving unit 20a are individually mounted inside the four corresponding second accommodation spaces 223a of the four second flanges 222a of the outer carrier structure 22a. In addition, the first coils 25a and the second coils 26a respective to the first magnets 23a and the second magnets 24a are individually mounted inside the corresponding first accommodation space 213a of the four first flanges 212a of the inner carrier structure 21a.

Figure 7:
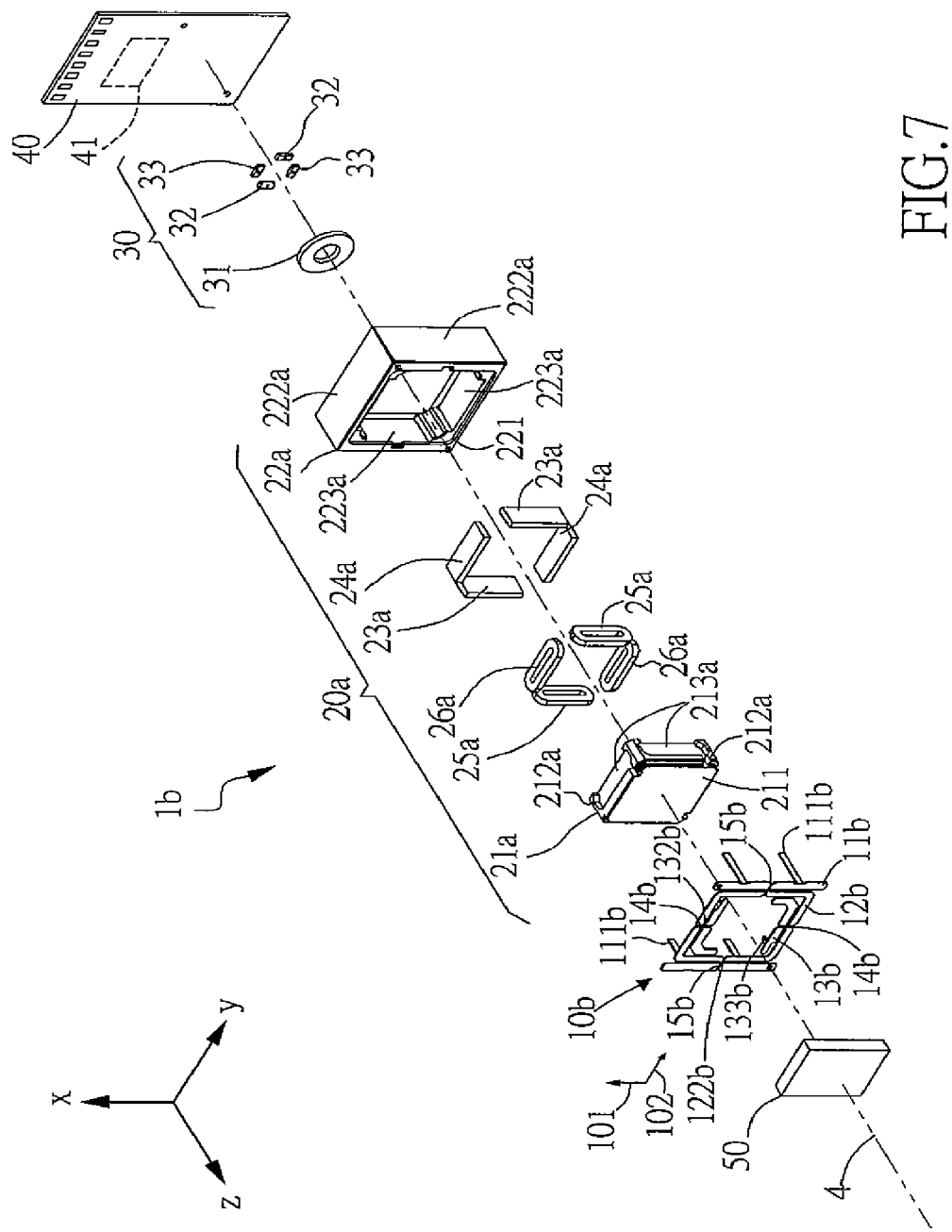
FIG. 7 is a schematic exploded view of a third embodiment of the thin-plate-typed rotating module in accordance with the present invention.
Figure 8A:
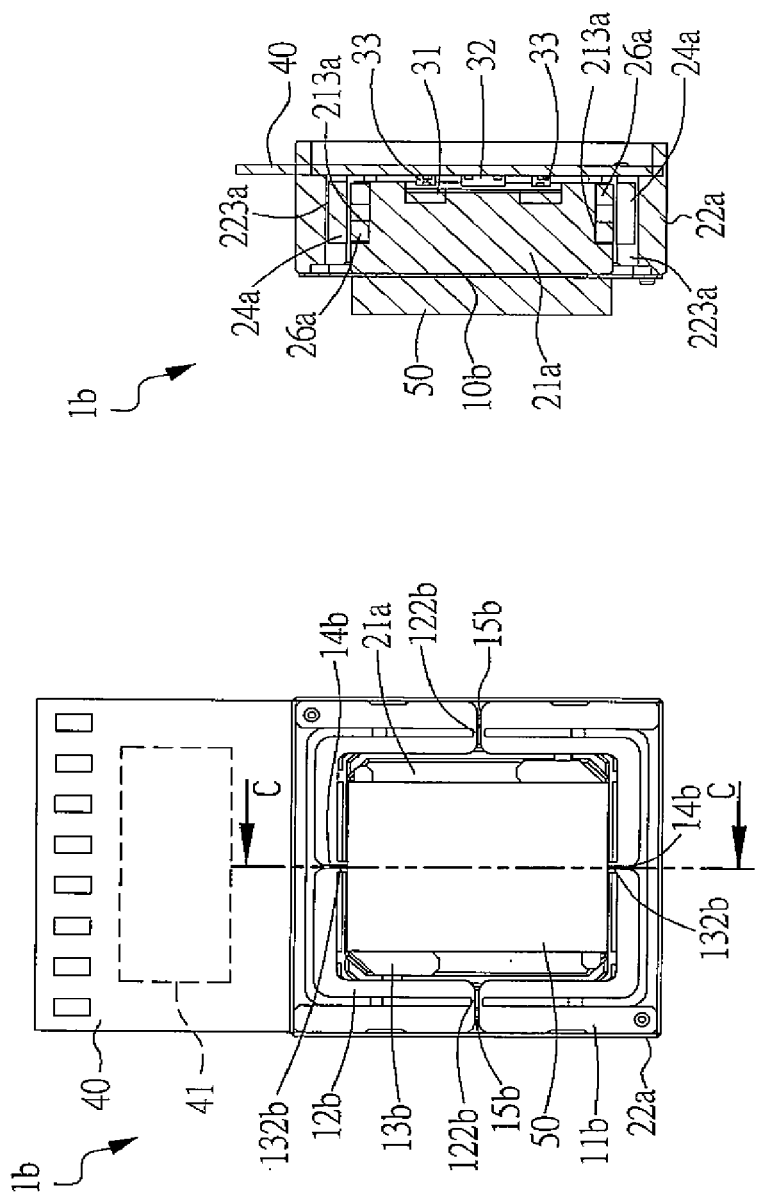
FIG. 8A is a top view of FIG. 7.
Figure 9:
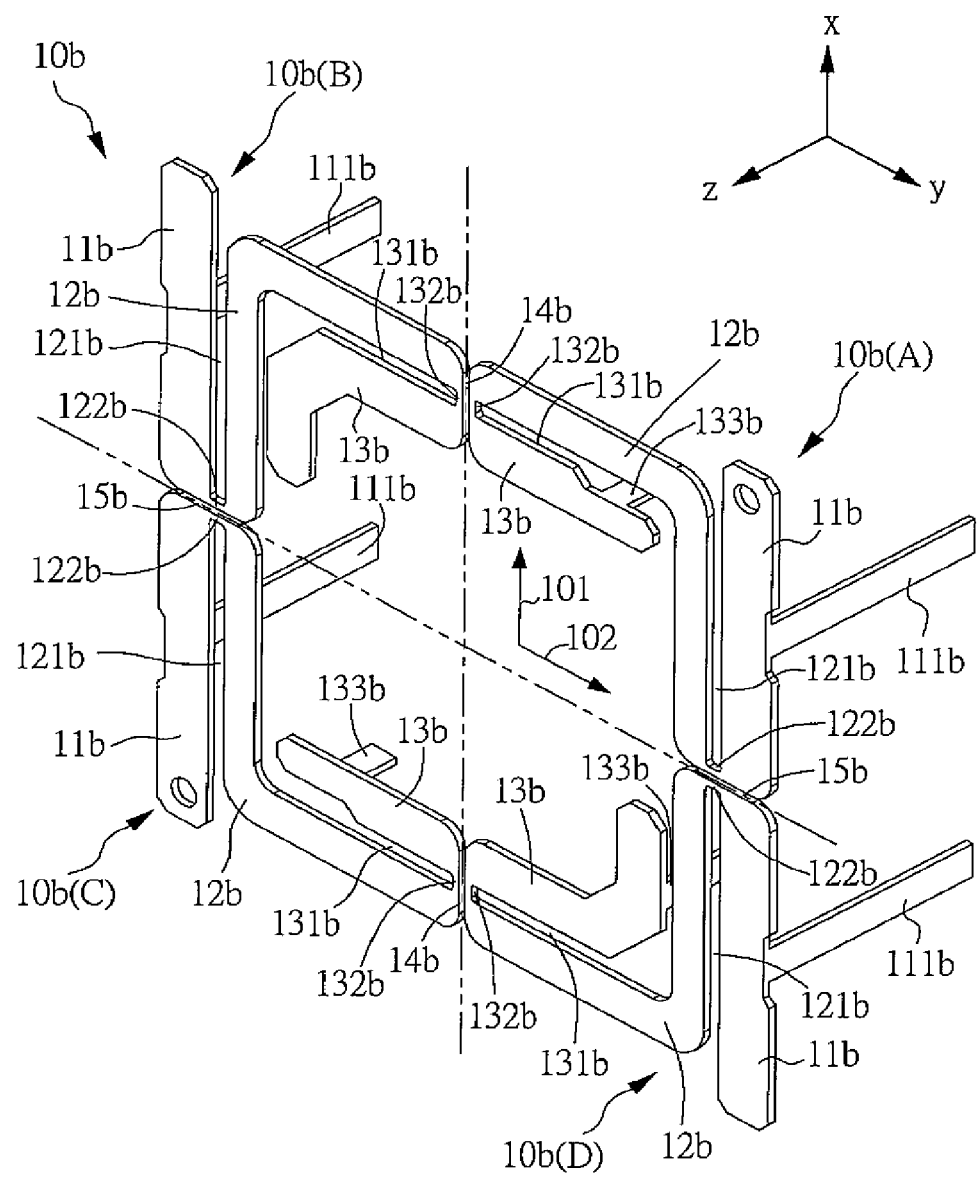
FIG. 9 is an enlarged view of the rotating element of FIG. 7.

Refer now to FIG. 7 to FIG. 9; where FIG. 7 is a schematic exploded view of a third embodiment of the thin-plate-typed rotating module in accordance with the present invention, FIG. 8A is a top view of FIG. 7, FIG. 8B is a cross-sectional view of FIG. 8A along line C-C, and FIG. 9 is an enlarged view of the rotating element of FIG. 7.

Since the third embodiment of the thin-plate-typed rotating module shown from FIG. 7 to FIG. 9 is largely similar structurally to the second embodiment shown from FIG. 4 to FIG. 6, and thus descriptions for the same elements would be omitted herein. The major difference between the second the third embodiments is that the rotating element 10b in the second embodiment is a rectangular thin-plated spring complex having four lateral sides. The rotating element 10b includes an outer frame 11b, a middle frame 12b, and an inner plate 13b. The inner plate 13b has a plane surface facing the optical path 4 and being defined with the first axial direction 101 and the second axial direction 102. The driving unit 20a is to push the inner plate 13b to undergo pivotal motions with respect to the outer frame 11b about the first axial direction 101 and the second axial direction 102.

The middle frame 12b circles around the periphery of the inner plate 13b, and thereby at least one first through trench 131b between the middle frame 12b and the inner plate 13b and two first connection ribs 132b lying in the first axial direction 101 (also referred as the first direction) and connecting the middle frame 12b and the inner plate 13b are formed. Namely, the inner plate 13b is connected with the middle frame 12b via the two first connection ribs 132b. A first separation cut 14b along the first axial direction 101 is continuously formed to divide the inner plate 13b, the middle frame 12b and the two first connection ribs 132b. The outer frame 11b circles around the periphery of the middle frame 12b, and thereby at least one second through trench 121b between the middle frame 12b and the outer frame 11b and two second connection ribs 122b lying in the second axial direction 102 (also referred as the second direction) and connecting the middle frame 12b and the outer frame 11b are formed. Namely, the middle frame 12b is connected with the outer frame 11b via the two second connection ribs 122b. A second separation cut 15b along the second axial direction 102 is continuously formed to divide the middle frame 12b (also referred as the middle frame section), the outer frame 11b and the two second connection ribs 122b.

Namely, the first separation cut 14b and the second separation cut 15b are largely orthogonally crossed so as thereby to divide the rotating element 10b into four independent elastic units 10b(A)~10b(D), each of the four independent elastic units 10b(A)~10b(D) is located at one corner of the rotating element 10b, and has a portion of the first connection rib 132b and a portion of the second connection rib 122b. In particular, each of the four independent elastic units 10b(A)~10b(D) is formed as a unique-piece spring structure.

In this third embodiment of the present invention, the rotating element 10b (also referred as the circuit component) can be made of a conductive elastic metallic material, and can be further divided into four independent elastic units 10b(A)~10b(D) (also referred as the first, third, fourth and second connecting units respectively). Each outer frame 11b (also referred as the first section) of any of the independent elastic units 10b(A)~10b(D) has a first protrusive lead 111b (also referred as the connecting point) extending vertically at a specific place thereof for providing electric coupling. Also, each inner plate 13b (also referred as the second section) of any of the independent elastic units 10b(A)~10b(D) has a second protrusive lead 133b extending vertically at another specific place thereof for providing electric coupling. In particular, the first protrusive leads 111b and the second protrusive leads 133b are all extended in the same direction, parallel to the Z axis substantially. The first protrusive leads 111b and the second protrusive leads 133b are to provide electric coupling with one of the driving unit 20 and the position-detecting unit 30.

Figure 10:
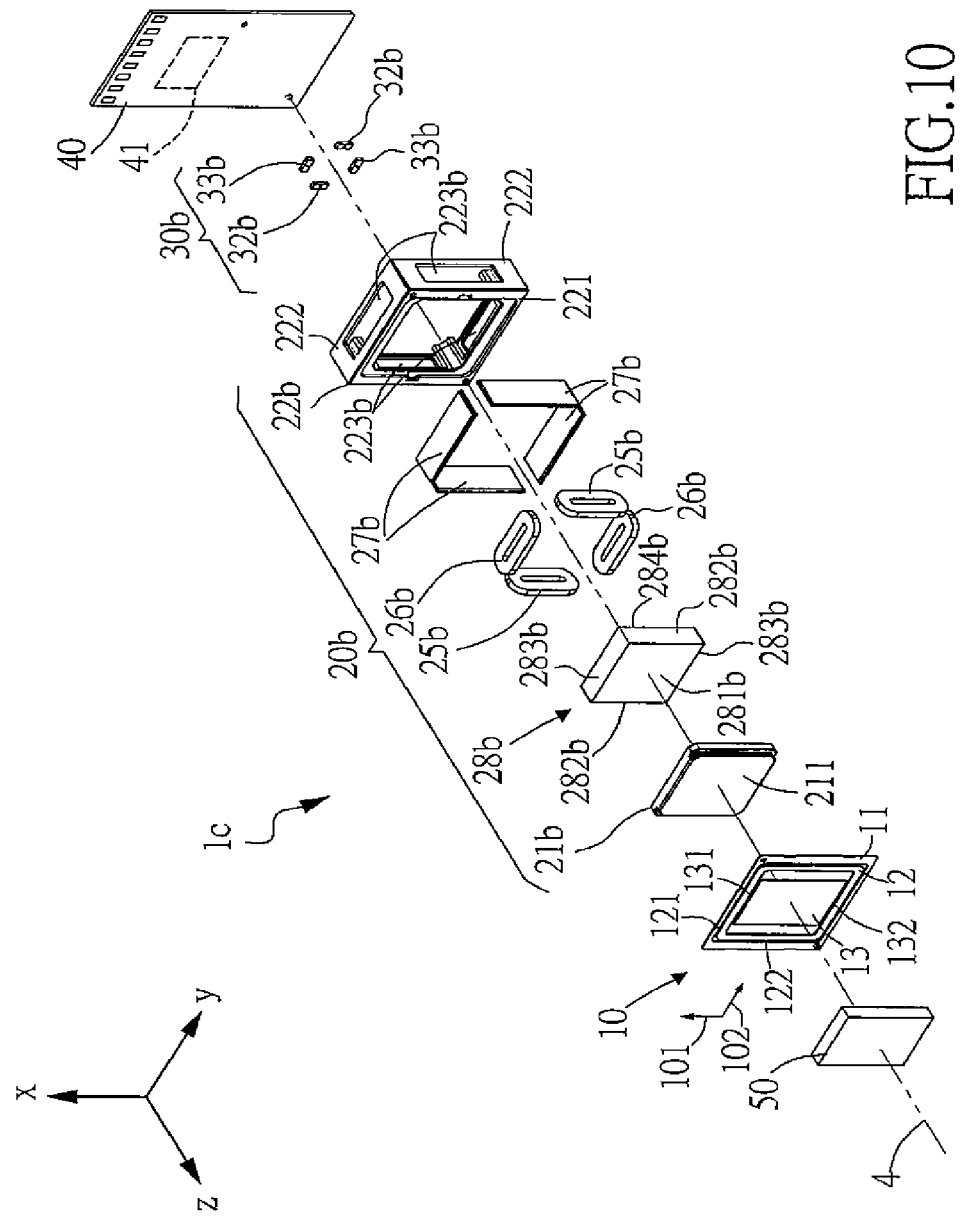
FIG. 10 is a schematic exploded view of a fourth embodiment of the thin-plate-typed rotating module in accordance with the present invention.

Referring now to FIG. 10, a schematic exploded view of a fourth embodiment of the thin-plate-typed rotating module in accordance with the present invention is shown. Since the fourth embodiment of the thin-plate-typed rotating module shown in FIG. 10 is largely similar structurally to the first embodiment shown in FIG. 1, and thus descriptions for the same elements would be omitted herein. The major difference between the fourth and the first embodiments is that, in the fourth embodiment 1c, the driving unit 20b is an electromagnetic driving unit including at least an inner carrier structure 21b, an outer carrier structure 22b, at least one induced magnet 28b, at least one first coil 25b (two shown in the figure) and at least one second coil 26b (two shown in the figure). The inner carrier structure 21b engages and thus co-moves with the inner plate 13, and the outer carrier structure 22b is fixed at the outer frame 11.

The induced magnet 28b formed as a cuboid includes an engagement surface 281b, a third magnetic surface 284b opposing to the engagement surface 281b, two opposing first magnetic surfaces 282b located as two opposing vertical sides to connect the engagement surface 281b and the third magnetic surface 284b, and two opposing second magnetic surfaces 283b connecting the two first magnetic surfaces 282b and also located as another two opposing vertical sides to connect the engagement surface 281b and the third magnetic surface 284b. The engagement surface 281b is to locate the induced magnet 28b onto the inner carrier structure 21b.

The first coil 25b is mounted at the outer carrier structure 22b at a place corresponding to the first magnetic surface 282b. Upon such an arrangement, by energizing the first coil 25b, a corresponding electromagnetic force can be produced to push the first magnetic surface 282b associated with the inner plate 13 to undergo a corresponding pivotal motion in the first axial direction 101. In addition, the second coil 26b is mounted at the outer carrier structure 22b at a place corresponding to the second magnetic surface 283b. Thus, by energizing the second coil 26b, a corresponding electromagnetic force can be produced to push the second magnetic surface 283b associated with the inner plate 13 to undergo another pivotal motion in the second axial direction 102. In this fourth embodiment, the first coil 25b is mounted to the corresponding second accommodation space 223b of the outer carrier structure 22b via the coil-fixing structure 27b, and similarly the second coil 26b is mounted to the corresponding second accommodation space 223b of the outer carrier structure 22b via the coil-fixing structure 27b.

The position-detecting unit 30b, located at a predetermined place on the base board 40 and respective to the induced magnet 28b, includes at least one X-axis position-detecting sensor 32b (two shown in the figure) and at least one Y-axis position-detecting sensor 33b (two shown in the figure). The X-axis position-detecting sensor 32b and the Y-axis position-detecting sensor 33b are individually located on the base board 40 by facing the third magnetic surface 284b of the induced magnet 28b. By providing the X-axis position-detecting sensor 32b and the Y-axis position-detecting sensor 33b to detect the induced magnet 28b, the angling of the third magnetic surface 284b can thus be realized.

Figure 11:
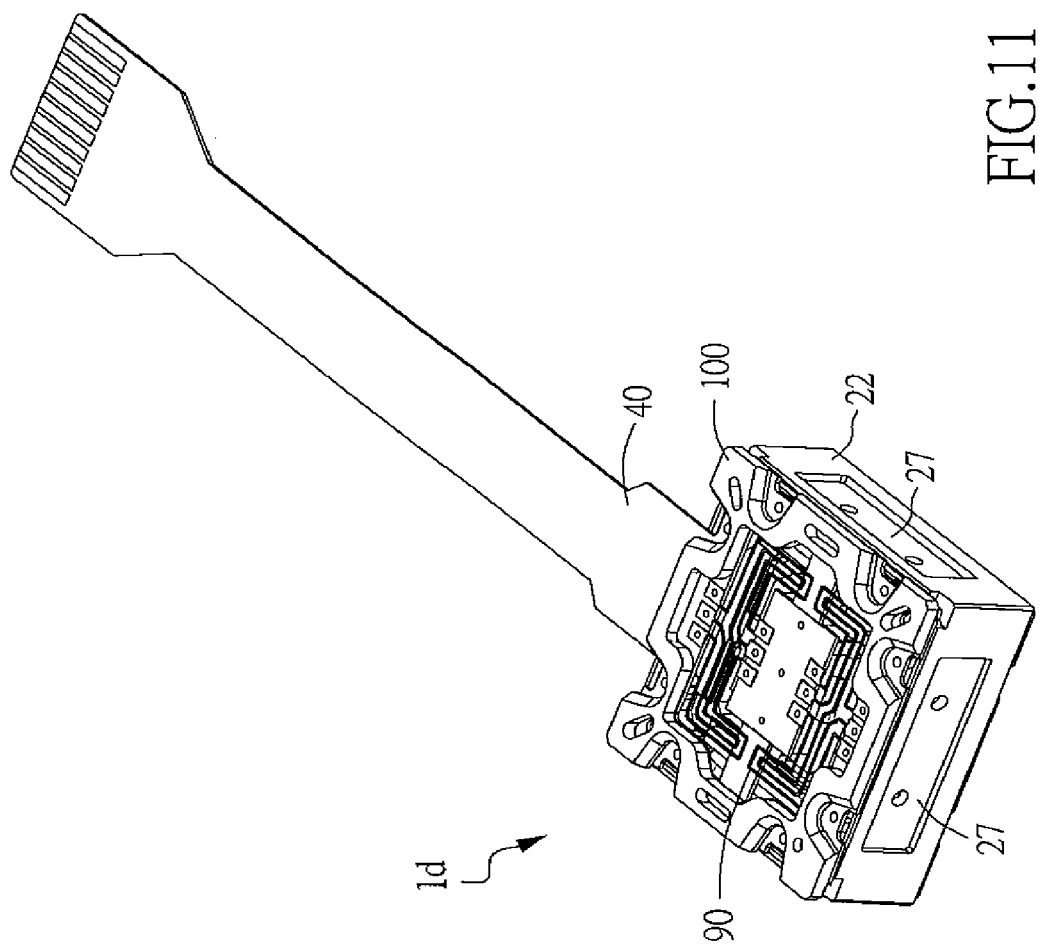
FIG. 11 is a schematic perspective view of a fifth embodiment of the thin-plate-typed rotating module in accordance with the present invention.
Figure 12:
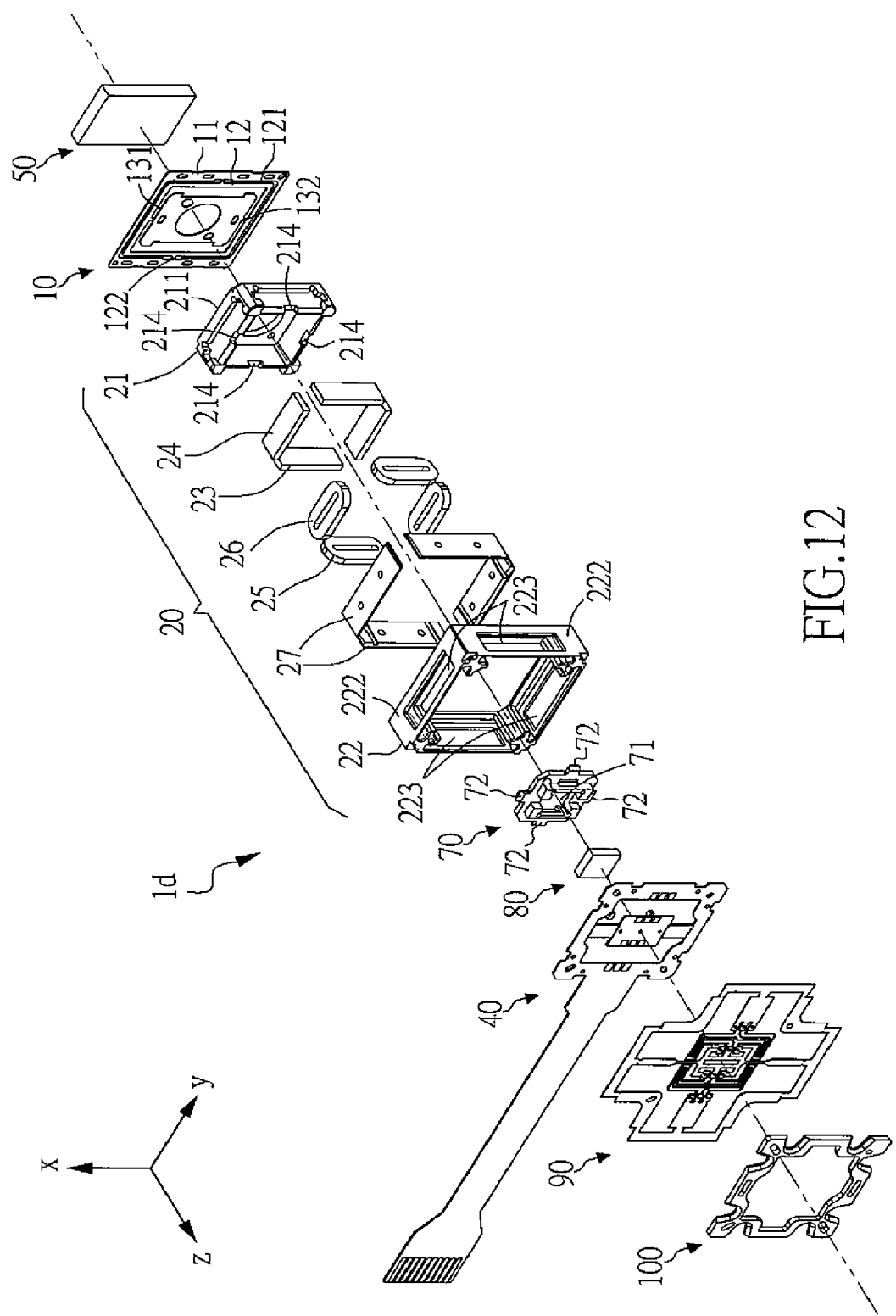
FIG. 12 is a schematic exploded view of FIG. 11.
Figure 13B:
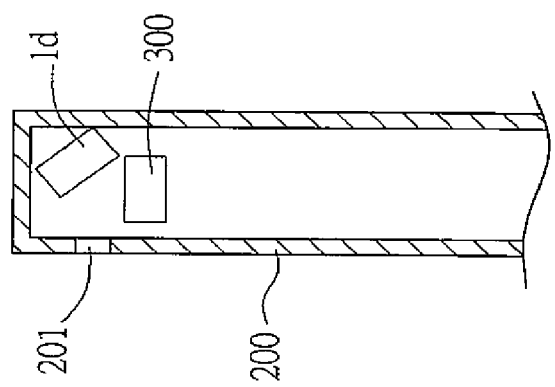
FIG. 13B is a schematic cross-sectional view showing a portion of FIG. 13A.
Figure 13A:
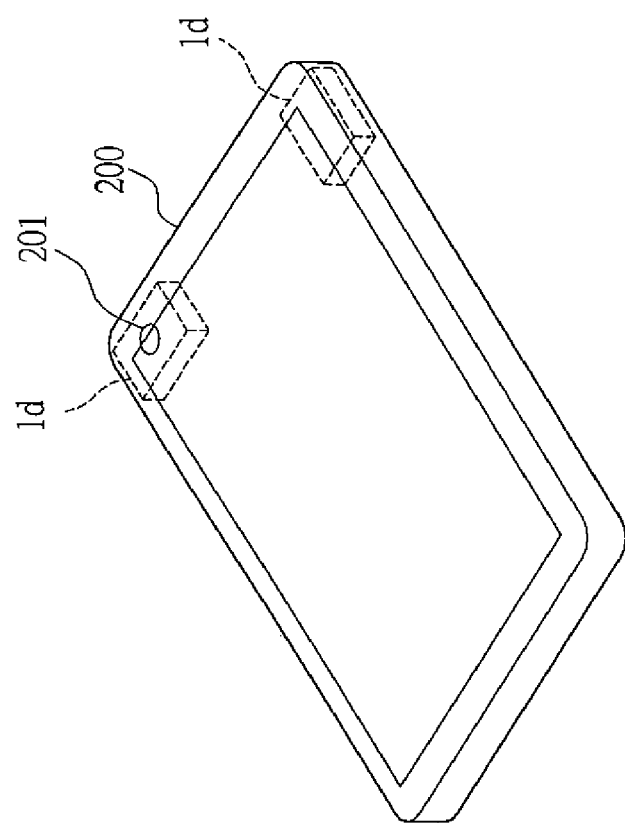
FIG. 13A is a schematic view showing an application of the thin-plate-typed rotating module of FIG. 11 to a mobile phone.

Refer now to FIG. 11, FIG. 12, FIG. 13A and FIG. 13B; where FIG. 11 is a schematic perspective view of a fifth embodiment of the thin-plate-typed rotating module in accordance with the present invention, FIG. 12 is a schematic exploded view of FIG. 11, FIG. 13A is a schematic view showing an application of the thin-plate-typed rotating module of FIG. 11 to a mobile phone, and FIG. 13B is a schematic cross-sectional view showing a portion of FIG. 13A. As shown, the fifth embodiment 1d of the thin-plate-typed rotating module is largely similar structurally to the first embodiment shown in FIG. 1, and thus descriptions for the same elements would be omitted herein. The major difference between the fifth and the first embodiments is that the fifth embodiment 1d further includes a fixation base 70, an angle-detecting module 80, a lower spring complex 90 and an end frame 100. The angle-detecting module 80 is mounted inside a fixation hole of the fixation base 70. The fixation base 70 is fixed to the inner carrier structure 21 by buckling between a plurality of buckle hooks 72 protrusive from the periphery of the fixation base 70 and the corresponding buckle notches 214 structured at the inner carrier structure 21. By providing the angle-detecting module 80 to detect the angular deviation of the inner carrier structure 21 caused mainly by hand shake, then a relevant compensation for correcting the deviation can thus be calculated. In addition, the end frame 100 is provided to fix orderly the lower spring complex 90 and the base board 40 to the outer carrier structure 22. The lower spring complex 90 is thus electrically coupled with the base board 40. In the fifth embodiment of the present invention, the angle-detecting module 80 can be a gyroscope. Since the angle-detecting module 80 (the gyroscope for example) can be adopted or selected from the conventional products already in the market place, and thus details thereabout are omitted herein.

Referring now to FIG. 13A and FIG. 13B, in the fifth embodiment 1d, the thin-plate-typed rotating module 1d is applied into a mobile phone 110 at a place forming a 45-degree angle with an image-capturing module 300 of the mobile phone, such that the optical path-adjusting element 50 of the thin-plate-typed rotating module 1d can right aim at an optical hole 201 of the mobile phone, so that foreign images can be reflected to the image-capturing module 300 through the optical hole 201. Of course, the location and angling of the thin-plate-typed rotating module 1d in the mobile phone shall meet various structuring of the corresponding optical hole 201; for example, to a front surface or a lateral side of the mobile phone 110.

While the present invention has been particularly shown and described with reference to a preferred embodiment, it will be understood by those skilled in the art that various changes in form and detail may be without departing from the spirit and scope of the present invention.

What is claimed is:

1. A driving mechanism of optical component, comprising:
   a movable part, capable of connecting an optical component;
   a fixed part, said movable part being movable relative to said fixed part;
   a driving unit, furnished between said movable part and said fixed part for driving said movable part to move relative to said fixed part; and
   a circuit component, having a thin-plate-typed structure made of electric conductive material and being electrically coupling with said driving unit; said circuit component comprising:
      a first connecting unit, the movable part being movably connected to the fixed part via the first connecting unit;

a second connecting unit, the movable part being movably connected to the fixed part via the second connecting unit;

a third connecting unit, the movable part being movably connected to the fixed part via the third connecting unit; and a fourth connecting unit, the movable part being movably connected to the fixed part via the fourth connecting unit;

wherein, each of said first connecting unit, said second connecting unit, said third connecting unit and said fourth connecting unit respectively includes a first section extending along a first direction;

wherein, said circuit component defines a thickness direction which is perpendicular to the first direction; when viewing along the thickness direction of the circuit component, said fixed part has a polygonal contour including a first side extending along the first direction and a fourth side extending parallel to and apart from the first side, in addition, the first section of the first connecting unit and the first section of the second connecting unit are both located at the first side of the fixed part; the first section of the third connecting unit and the first section of the fourth connecting unit are both located at the fourth side of the fixed part;

wherein the first connecting unit, the second connecting unit, the third connecting unit and the fourth connecting unit are electrically independent of each other.

2. The driving mechanism of claim 1, wherein the first connecting unit further includes a second section extending along a second direction; said second direction is perpendicular to the thickness direction of the circuit component; said first direction and said second direction are not parallel; the movable part being movably connected to the fixed part via the first section and the second section of the first connecting unit.

3. The driving mechanism of claim 2, wherein:
when viewing along the thickness direction of the circuit component, said fixed part further includes a second side; extending directions of said first side and said second side of the fixed part are different;
said second section of said first connecting unit is located adjacent to the second side of the fixed part;
said first section of said first connecting unit is connected to the fixed part, while the second section of said first connecting unit is connected to the movable part.

4. The driving mechanism of claim 3, wherein:
the second connecting unit further includes a second section extending along the second direction; the movable part being movably connected to the fixed part via the first section and the second section of the second connecting unit;
when viewing along the thickness direction of the circuit component, said fixed part further includes a third side; extending directions of said first side and said third side of the fixed part are different;
said second section of said second connecting unit is located adjacent to the third side of the fixed part;
said first section of said second connecting unit is connected to the fixed part, while the second section of said second connecting unit is connected to the movable part.

5. The driving mechanism of claim 4, wherein, when viewing along the thickness direction of the circuit component, the extending directions of said second side and said third side of the fixed part are parallel; said second side is apart from said third side of the fixed part; said movable part is located between the second side and the third side of the fixed part.

6. The driving mechanism of claim 5, wherein, when viewing along the thickness direction of the circuit component, the first section of the first connecting unit and the first section of the second connecting unit are respectively connected to different locations of the first side of the fixed part.

7. The driving mechanism of claim 6,
wherein, when viewing along the thickness direction of the circuit component:
each of said third connecting unit and said fourth connecting unit respectively includes a second section extending along the second direction;
the first section of the third connecting unit and the first section of the fourth connecting unit are respectively located at and also connected to different locations of the fourth side of the fixed part;
said movable part is located between the first side and the fourth side of the fixed part;
said second section of said third connecting unit is located adjacent to the second side of the fixed part; said second section of said fourth connecting unit is located adjacent to the third side of the fixed part; the second section of said third connecting unit and the second section of the fourth connecting unit are respectively connected to different locations of the movable part.

8. The driving mechanism of claim 7, wherein, when viewing along the thickness direction of the circuit component:
the first section of the first connecting unit is connected to the fixed part at a first connecting point; the first section of the second connecting unit is connected to the fixed part at a second connecting point; the first section of the third connecting unit is connected to the fixed part at a third connecting point; the first section of the fourth connecting unit is connected to the fixed part at a fourth connecting point;
a distance between the first connecting point and the second connecting point is different to another distance between the first connecting point and the third connecting point; in addition, the distance between the first connecting point and the second connecting point is different to yet another distance between the first connecting point and the fourth connecting point.

9. The driving mechanism of claim 8, wherein, when viewing along the thickness direction of the circuit component, the distance between the first connecting point and the second connecting point is approximately equal to the distance between the third connecting point and the fourth connecting point.

10. The driving mechanism of claim 7, wherein:
the movable part is an inner carrier structure;
the fixed part is an outer carrier structure;
the circuit component is a rotating element;
the first section of each of the first, second, third and fourth connecting units is an outer frame section;
the second section of each of the first, second, third and fourth connecting units is an inner frame section;
each of the first, second, third and fourth connecting units further includes an elongated middle frame section connecting between the outer frame section and the inner frame section thereof; one end of said middle frame section is connected to the inner frame section via a first connection rib; another end of said middle frame section is connected to the outer frame section via a second connection rib; the first connection rib is lying in the first direction, while the second connection rib is lying in the second direction;

said second connection ribs of the first and second connecting units are located adjacent to a middle point of the first side of the fixed part; said second connection ribs of the third and fourth connecting units are located adjacent to a middle point of the fourth side of the fixed part; said first connection ribs of the first and third connecting units are located adjacent to a middle point of the second side of the fixed part; said first connection ribs of the second and fourth connecting units are located adjacent to a middle point of the third side of the fixed part;

for each of the first, second, third and fourth connecting units, the inner frame section is rotatable relative to the outer frame section about a first axial direction by means of the first connection rib, in addition, the inner frame section together with the middle frame section are rotatable relative to the outer frame section about a second axial direction by means of the second connection rib; said first axial direction is parallel to said first direction, while said second axial direction is parallel to said second direction; the first direction, the second direction and the thickness direction are perpendicular to each other;

the movable part engages the inner frame sections of the first, second, third and fourth connecting units in a co-moving manner, while the outer frame sections of the first, second, third and fourth connecting units are fixed at the fixed part; such that, when the driving unit drives the movable part to move relative to the fixed part, the movable part undergoes a limited pivotal motion about the first axial direction and/or the second axial direction by means of the circuit component.

11. The driving mechanism of claim 10, wherein:

said driving unit comprises at least a magnet and at least a coil; the coil is located at the movable part while the magnet is located at the fixed part; the coil can be energized to cooperate with the magnet in order to produce an electromagnetic force to push the movable part to undergo said limited pivotal motion relative to the fixed part;

the coil is electrically coupling to the inner frame section of one of the first, second, third and fourth connecting units, while the outer frame section of one of the first, second, third and fourth connecting units is electrically coupling to a base board which is fixed to the fixed part.

12. The driving mechanism of claim 11, wherein the driving mechanism further comprises a sensing magnet mounted on a bottom surface the movable part; the base board is furnished with a control module and at least one position-detecting sensor; said at least one position-detecting sensor is mounted on the base board at a predetermined position respective to the sensing magnet in order to detect position differences of the movable part; said at least one position-detecting sensor and the outer frame section are coupling to the control module; said control module supplies electric power to the coil via the circuit component.

13. The driving mechanism of claim 10, wherein the middle frame section is an L-shaped elongated element having a first elongated portion and a second elongated portion; said first elongated portion is adjacent to the outer frame section and extends along the first direction; said second elongated portion is adjacent to the inner frame section and extends along the second direction; one end of the first elongated portion is connected to the outer frame section via the second connection rib; the other end of the first elongated portion is connected to one end of the second elongated portion; the other end of the second elongated portion is connected to the inner frame section via the first connection rib.

* * * * *